United States Patent
Grushkevich et al.

(10) Patent No.: US 8,331,922 B2
(45) Date of Patent: Dec. 11, 2012

(54) REMOTE HOST CONTROLLER INTERFACE CONTROL FOR DEVICES

(75) Inventors: Asif Grushkevich, La Jolla, CA (US); Angel Polo, San Diego, CA (US); Thomas Baker, Manhattan Beach, CA (US); Brima Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 961 days.

(21) Appl. No.: 11/947,362

(22) Filed: Nov. 29, 2007

(65) Prior Publication Data
US 2009/0143060 A1 Jun. 4, 2009

(51) Int. Cl.
*H04M 3/00* (2006.01)

(52) U.S. Cl. .................. 455/419; 455/418; 455/420

(58) Field of Classification Search .......... 455/418–420, 455/41.1–41.3, 517
See application file for complete search history.

(56) References Cited

U.S. PATENT DOCUMENTS

| | | | |
|---|---|---|---|
| 7,809,333 B2 | 10/2010 | Jougit | |
| 2003/0025683 A1* | 2/2003 | Adler | 345/204 |
| 2004/0048569 A1* | 3/2004 | Kawamura | 455/41.1 |
| 2004/0171346 A1* | 9/2004 | Lin | 455/3.05 |
| 2004/0263522 A1* | 12/2004 | Goodfellow | 345/530 |
| 2005/0009470 A1* | 1/2005 | Kim | 455/41.2 |
| 2005/0021307 A1* | 1/2005 | Schneider et al. | 702/188 |
| 2007/0061587 A1* | 3/2007 | Kim | 713/182 |
| 2007/0198997 A1* | 8/2007 | Jacops et al. | 719/328 |
| 2008/0045202 A1* | 2/2008 | Chan et al. | 455/420 |
| 2008/0081560 A1 | 4/2008 | Jougit | |
| 2008/0212648 A1 | 9/2008 | Jougit et al. | |
| 2008/0212649 A1 | 9/2008 | Jougit | |
| 2010/0323620 A1* | 12/2010 | Jougit | 455/41.2 |

OTHER PUBLICATIONS

Broadcom Corporation, BCM 2004 Product Brief, pp. 1-2, Mar. 30, 2004, Irvine, CA.
Broadcom Corporation, BCM 2037 Product Brief, pp. 1-2, Sep. 25, 2006, Irvine, CA.
Broadcom Corporation, BCM 2040 Product Brief, pp. 1-2, Mar. 14, 2006, Irvine, CA.
Broadcom Corporation, BCM 2042 Product Brief, pp. 1-2, Nov. 8, 2006, Irvine, CA.
Broadcom Corporation, BCM 2044 Product Brief, pp. 1-2, Jan. 8, 2007, Irvine, CA.
Broadcom Corporation, BCM 2045 Product Brief, pp. 1-2, May 10, 2007, Irvine, CA.
Broadcom Corporation, BCM 2046 Product Brief, pp. 1-2, Jun. 19, 2007, Irvine, CA.
Broadcom Corporation, BCM 2047 Product Brief, pp. 1-2, Jan. 22, 2007, Irvine, CA.
Broadcom Corporation, BCM 2048 Product Brief, pp. 1-2, May 7, 2007, Irvine, CA.
Broadcom Corporation, BCM 4325 Product Brief, pp. 1-2, Jan. 31, 2007, Irvine, CA.
Specification of the Bluetooth System, Master Table of Contents & Compliance Requirements, vol. 0, pp. 1-1230 Nov. 4, 2004.

* cited by examiner

*Primary Examiner* — Kamran Afshar
*Assistant Examiner* — Kashif Siddiqui
(74) *Attorney, Agent, or Firm* — Brake Hughes Bellermann LLP

(57) ABSTRACT

A device may include a communication module that is arranged and configured to establish a wireless connection with a remote device and a remote mode module that is arranged and configured to receive and process an enabling command that places the device in a host controller interface (HCI) remote control mode, where the HCI remote control mode enables the device to be controlled by the remote device using one or more HCI commands over the wireless connection.

17 Claims, 4 Drawing Sheets

REMOTE HOST CONTROLLER INTERFACE CONTROL FOR DEVICES

TECHNICAL FIELD

This description relates to remote host controller interface control for devices.

BACKGROUND

One device may communicate with another device using a communication protocol. The communication protocol may include a procedure for the two devices to establish a connection. After establishing a connection, the devices may follow a protocol for sending communication traffic between the devices. For example, two Bluetooth®-enabled devices, such as two cell phones, may communicate with one another using the Bluetooth protocol. After establishing a connection, the devices may follow the Bluetooth protocol for sending communication traffic between the devices.

SUMMARY

The details of one or more implementations are set forth in the accompanying drawings and the description below. Other features will be apparent from the description and drawings, and from the claims.

DETAILED DESCRIPTION

Figure 1:
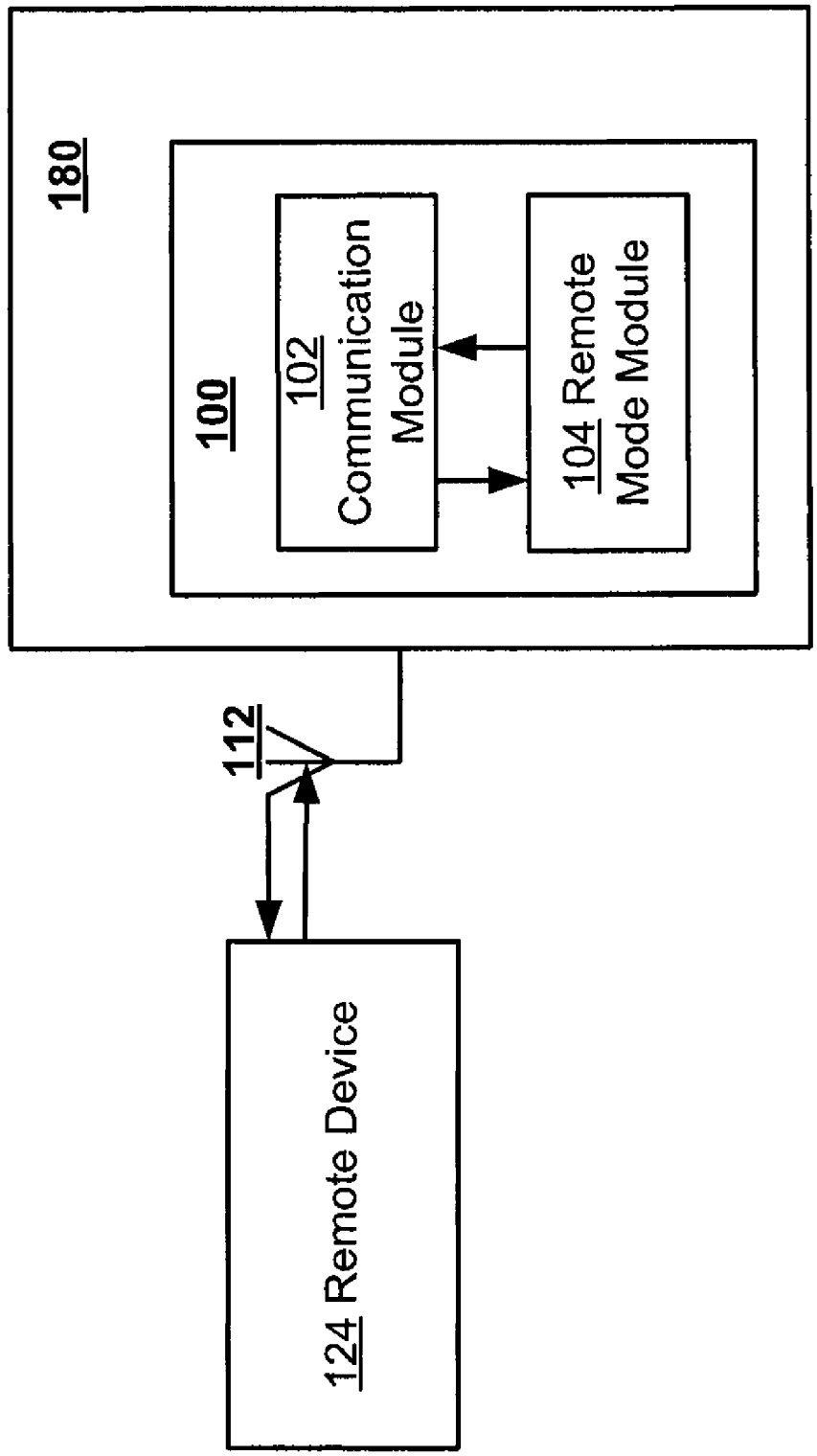
FIG. 1 is an exemplary block diagram of a system for wirelessly controlling a device using a remote device.

Referring to FIG. 1, a system 100 for enabling wireless control of a device 180 by a remote device 124 is illustrated. System 100 may include a communication module 102 and a remote mode module 104. The communication module 102 may be arranged and configured to establish a wireless connection with a remote device 124 using antenna 112. The remote mode module 104 may be arranged and configured to receive and process an enabling command that places the device 180 in a host controller interface (HCI) remote control mode, where the HCI remote control mode enables the device 180 to be controlled by the remote device 124 using one or more HCI commands over the wireless connection. In this manner, the remote device 124 may send one or more HCI commands to the device 180 using the established wireless connection. The device 180, at the remote mode module 104, may receive the HCI commands sent by the remote device 124 and execute the HCI commands. In response to executing the HCI commands, the remote mode module 104 may generate and communicate an HCI event to the remote device 124. In one exemplary implementation, system 100 enables the device 180 to receive and process HCI commands wirelessly from the remote device 124, where the HCI commands may be arranged and configured to test one or more of the features and/or modules of the device 180.

In one exemplary implementation, the communication module 102 may establish a Bluetooth wireless connection with the remote device 124. The Bluetooth protocol may be used by the device 180 and the remote device 124 to communicate with each other. One of the devices may be a master device and the other device may be a slave device.

In one exemplary implementation, the system 100 may be arranged and configured to operate in many different types of devices 180. For example, system 100 may be arranged and configured to operate in a cellular phone, a smart phone, an MP3 player, an iPod® player, a personal digital assistant (PDA), a mobile handset, other types of devices, and/or in devices that include a combination of these types of devices. These one or more devices 180 may be arranged and configured to communicate with other devices using a communication protocol. For example, these devices 180 may use a Bluetooth protocol to communicate with one another.

In one exemplary implementation, the system 100 may be arranged and configured to be implemented as an integrated circuit. The integrated circuit may be arranged and configured to operate in many different types of devices 180. For example, system 100 may be arranged and configured to operate in a cellular phone, a smart phone, an MP3 player, an iPod® player, a personal digital assistant (PDA), a mobile handset, other types of devices, and/or devices that include any combination of these types of devices. The integrated circuit may be arranged and configured to be implemented as a single chip solution that operates in the different types of applications described above. The components of system 100 may be implemented on one or more integrated circuits and in some instances, one or more components may be implemented on one integrated circuit and the remaining components may be implemented on a different integrated circuit, with the two integrated circuits capable of communicating with each other.

The remote mode module 104 may be configured to receive and process the enabling command that places the device 180 in an HCI remote control mode. In one exemplary implementation, the enabling command may be received from another device over a wired connection. For example, the device 180 may be connected to another device using a universal asynchronous receiver/transmitter (UART) cable. In this manner, the enabling command may be communicated in a secure manner since entering the HCI remote control mode enables the device 180 to be controlled wirelessly by another device, such as by the remote device 124. The enabling command may be received from the remote device 124, a host device, or another device that has established a wired connection with the device 180. Any wired connection may be disconnected once the wireless connection between the device 180 and the remote device 124 has been established and the enabling command has been received by the remote mode module 104. With any wired connection removed, the device 180 may be controlled wirelessly by the remote device 124. Removing any wired connection may enable tests to be performed on the features and functionality of the device 180 without the wired connection skewing or otherwise affecting the tests.

In another exemplary implementation, the enabling command may be received from another device over a wireless connection. For example, the device 180 may be connected to another device using a wireless connection and the other device may send the enabling command to the remote mode module 104 over the wireless connection. In yet another exemplary implementation, the remote mode module 104 may receive the enabling commands by other means including, for example, receiving the enabling command upon booting up from a flash memory that places the device 180 in the HCI remote control mode.

The HCI remote control mode enables the device 180 to receive HCI commands from the remote device 124 and to process those HCI commands. In this manner, the device 180 receives and processes the HCI commands instead of merely receiving the HCI commands and simply forwarding the HCI commands to another device, such as, for example, a host device. HCI commands may include any type of HCI command including without limitation, for example, vendor or manufacturer specific HCI commands. The remote mode module 104 may wirelessly respond to the remote device 124 with an HCI event using the established wireless connection. HCI events may include any type of HCI event including without limitation, for example, vendor or manufacturer specific HCI events.

Figure 2:
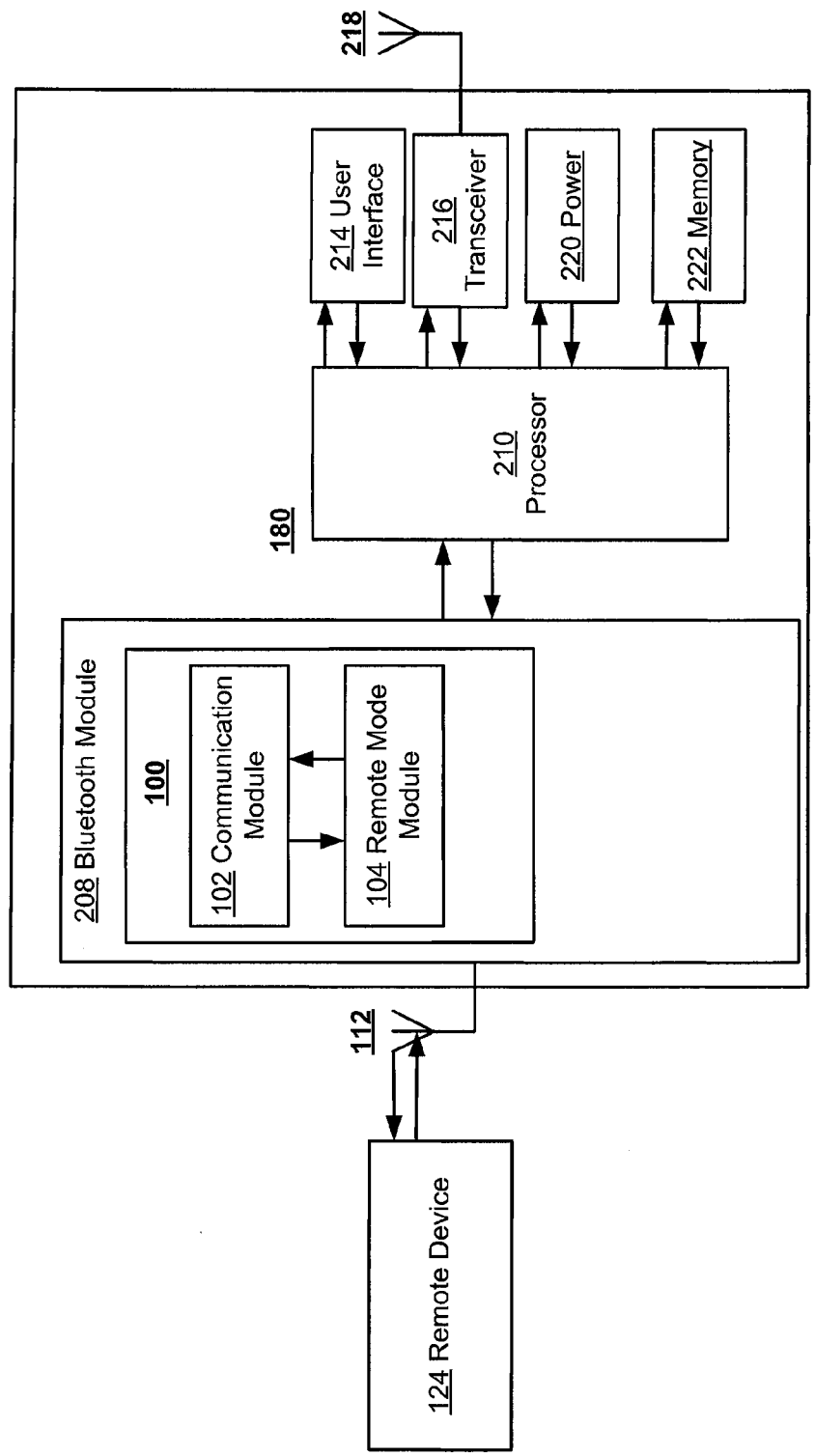
FIG. 2 is an exemplary block diagram of an exemplary implementation of the system of FIG. 1.

Referring also to FIG. 2, system 100 may be included with a Bluetooth module 208 having an antenna 112. The Bluetooth module 208 may be included as a component of the device 180. The device 180 also may include a processor 210, a user interface 214, a transceiver 216 having an antenna 218, a power module 220 and a memory module 222. The device 180 may be arranged and configured to communicate with the remote device 124 using one or more communication protocols including, for example, the Bluetooth protocol. The device 180 may include the types of devices discussed above with respect to FIG. 1 including any type of Bluetooth-enabled device. The remote device 124 also may include the same types of devices discussed above with respect to FIG. 1, including any Bluetooth-enabled device.

The Bluetooth module 208 may include system 100 as well as other Bluetooth-related components (not shown) for the operation of the Bluetooth functionality. For example, the Bluetooth module 208 may include additional Bluetooth-related components (not shown) including a channel manager, a logical link control and adaption protocol (L2CAP) resource manager, a device manager, a link manager, a baseband resource manager, a link controller, and/or a radio frequency block. The Bluetooth module 208 may enable the device 180 to communicate with the remote device 124 and other Bluetooth-enabled devices using the Bluetooth protocol through antenna 112. System 100 and its components include the functionality and features described above with respect to FIG. 1.

The processor 210 may be arranged and configured to control the functioning and overall operation of the device 180, including the other components of the device 180. The processor 210 may include application specific firmware, operating instructions, and/or other software to control the operation of the device 180.

The user interface 214 may be arranged and configured to accept input from a user and to convey information to a user through a display or otherwise. In a Bluetooth-enabled cellular phone, for example, the user interface may include keys, buttons, a touch screen, a stylus for use with a screen, and/or other input interfaces. Interaction with the user interface may include opening a flip lid to the cellular phone or otherwise activating the cellular phone.

The transceiver 216 may be arranged and configured to communicate with other devices through antenna 218 using one or more communication protocols. For example, the transceiver 216 may include a cellular transceiver that is arranged and configured to communicate cellular messages with other devices. Additionally and/or alternatively, the transceiver 216 may include a frequency modulation (FM) transceiver that may be arranged and configured to transmit and receive messages using frequency modulation.

The power module 220 may be arranged and configured to provide power to the device 180 and its components. The power module 220 may include a source of power such as, for example, one or more batteries.

The memory module 222 may be arranged and configured to store information to be used by other components of the device 180. For example, the memory module 222 may store any information collected by the communication module 102 and/or the remote mode module 104. The memory module 222 also may store any type of configuration information, including any configurable settings, relating to system 100 and/or the device 180.

In this exemplary implementation of system 100 as illustrated in FIG. 2, the device 180 may function as a master device and/or as a slave device with respect to the Bluetooth protocol. Likewise, if the remote device 124 is a Bluetooth-enabled device, then the remote device 124 may function as a master device and/or as a slave device with respect to the Bluetooth protocol.

In one exemplary implementation, the device 180 may communicate with the remote device 124 using the Bluetooth protocol. The communication module 102 may establish a Bluetooth wireless connection with the remote device 124. The remote mode module 104 may receive and process an enabling command that places the device 180 in an HCI remote control mode. For example, the enabling command may be received by the device 180 over a wired connection from another device (e.g., a host device). The enabling command may be a script command, a Bluetooth command, or any other format of command. The HCI remote control mode enables the device 180 to be controlled by the remote device 124 using one or more HCI commands over the Bluetooth wireless connection.

In one exemplary implementation, the remote mode module 104 may receive an HCI command that includes a standard Bluetooth command to execute a standard Bluetooth function on the device 180. The HCI command may be received wirelessly from the remote device 124 over the Bluetooth wireless connection. When the received command is processed, then the Bluetooth function is executed on the device 180. In this manner, for example, the Bluetooth features and functionality of the device 180 may be tested remotely by sending HCI commands that include a standard Bluetooth command from the remote device 124. This enables a designer and/or a user to test a Bluetooth-enabled device from a remote device using a wireless connection. The remote mode module 104 may generate and communicate an HCI event to the remote device 124 that provides a response to the received and executed HCI command.

In one exemplary implementation, the remote mode module 104 may receive an HCI command that includes a command to control an aspect of the transceiver 216. The remote mode module 104 may process and execute the command that controls the aspect of the transceiver 216. For example, as part of a testing process, one or more aspects of the transceiver 216 may be tested, such as, scanning the transceiver channels, tuning to a particular transceiver channel, and other tests of the transceiver components and features. If the testing process is performed using a wired connection (e.g., a UART cable), then the testing features may significantly affect the testing because the wired connection may start functioning like an antenna. Instead of using a wired connection, a wireless connection between the remote mode module 104 in the device 180 and the remote device 124 may be used. The remote mode module 104 may receive an HCI command from the remote device 124 using the wireless connection (e.g., a wireless Bluetooth connection), where the HCI command includes a command to perform a test on an aspect of the transceiver 216. The remote mode module 104 may execute the command and the test may be performed on the transceiver 216. The remote mode module 104 may generate and communicate an HCI event to the remote device 124 that provides a response to the received and executed HCI command.

Figure 3:
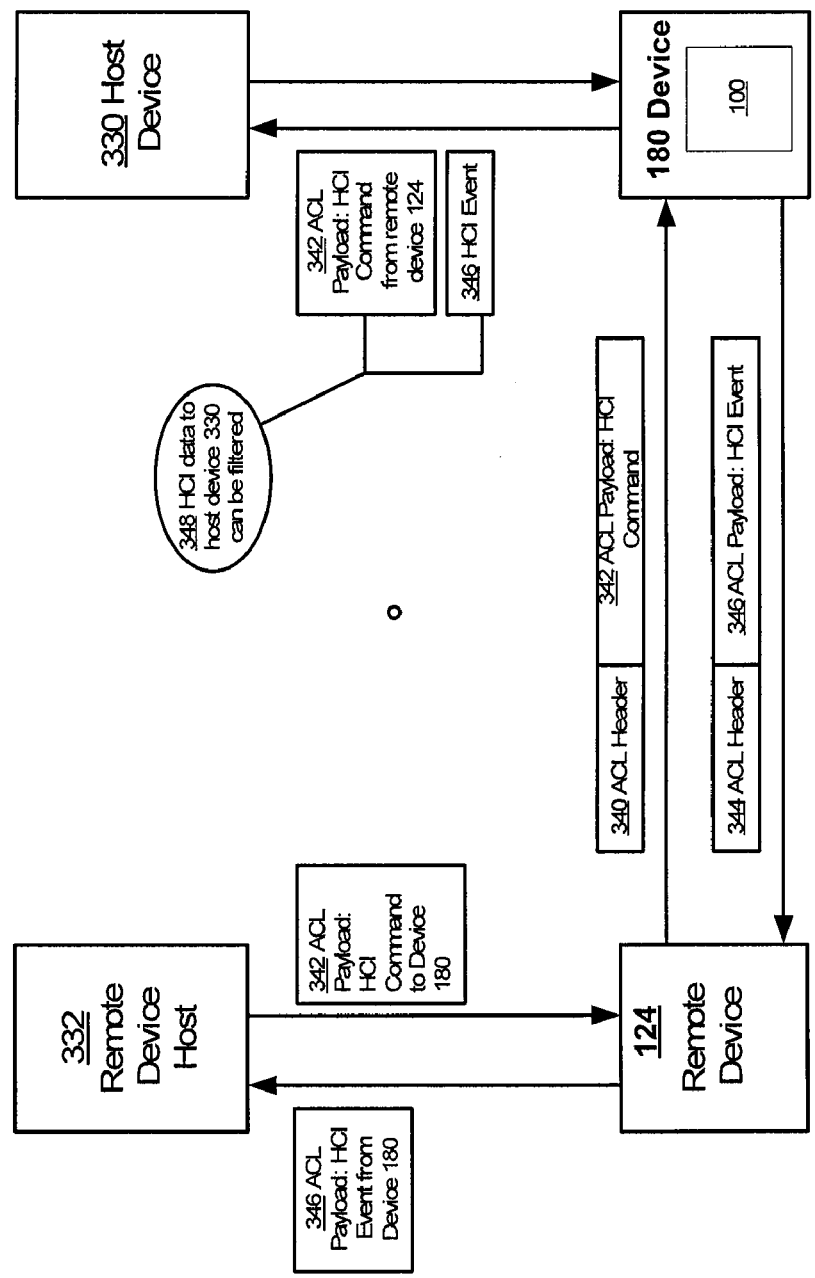
FIG. 3 is an exemplary block diagram of an exemplary implementation of the system of FIG. 1.

Referring to FIG. 3, an exemplary block diagram of the operation of system 100 in an exemplary testing system 300 is shown. The device 180 includes system 100 with the communication module 102 and the remote mode module 104. The device 180 may communicate with a host device 330. The communications between the device 180 and the host device 330 may be over a wired connection, such as, for example, over a UART cable. The host device 330 may include any type of computing device such as, for example, a personal computer, a laptop, a handheld device, a PDA, or other type of computing devices. In this exemplary implementation, the host device 330 may be a host and the device 180 may be a host controller.

The communication module 102 may establish a wireless connection with the remote device 124. For instance, the communication module 102 may establish a Bluetooth wireless connection with the remote device 124. Then, the remote mode module 104 may receive and process an enabling command from the host device 330 using, for example, a wired connection. The enabling command may place the device 180 in the HCI remote control mode. Once the remote mode module 104 has received the enabling command, the wired connection between the device 180 and the host device 330 may be disconnected.

The remote mode module 104 may receive HCI commands from the remote device 124 using the established wireless connection. For example, the remote device 124 may send an asynchronous connection-oriented logical (ACL) transport that includes an ACL header 340 and an ACL payload 342 containing an HCI command. The remote mode module 104 may receive the ACL header 340 and the ACL payload 342 and execute the HCI command. In response to receiving and processing the HCI command, the remote mode module 104 may generate and communicate an ACL transport, including an ACL header 344 and an ACL payload 346 containing an HCI event, to the remote device 124.

In one exemplary implementation, if a connection has been maintained between the device 180 and the host device 330, then the ACL payloads 342 and 346 may be communicated from the device 180 to the host device 330. The ACL payloads 342 and 346 may contain the HCI command from the remote device 124 and the HCI event from the remote mode module 104. The HCI data, including the HCI command and the HCI event, that is communicated to the host device 330 may be filtered data 348.

In one exemplary implementation, the remote device 124 may be connected to and/or communicate with a remote device host 332. The remote device host 332 may be any type of computing device such as, for example, a personal computer, a laptop, a handheld device, a PDA, or other types of computing devices. In this exemplary implementation, the remote device host 332 may be a host and the remote device 124 may be a host controller.

The remote device host 332 may generate the ACL payload 342 that contains the HCI command. The remote device host 332 may communicate the ACL payload 342 to the remote device 124 and then the remote device 124 may communicate the ACL payload 342 to the device 180. Also, the remote device 124 may communicate the ACL payload 346 containing the HCI event to the remote device host 332.

Figure 4:
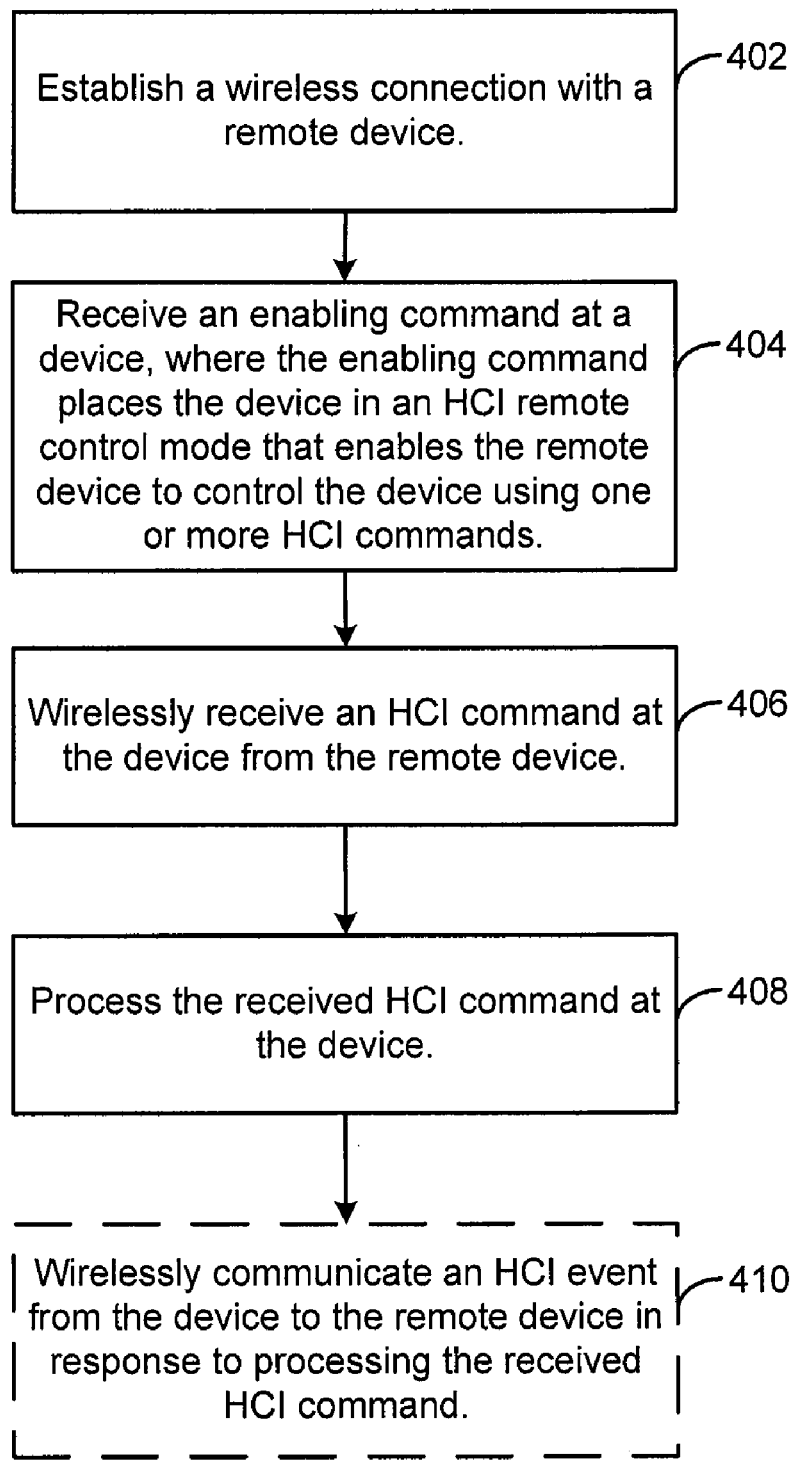
FIG. 4 is an exemplary flowchart illustrating example operations of the system of FIG. 1.

Referring to FIG. 4, a process 400 is illustrated for wirelessly controlling a device using a remote device. Process 400 may include establishing a wireless connection with a remote device (402) and receiving an enabling command at a device, where the enabling command places the device in an HCI remote control mode that enables the remote device to control the device using HCI commands (404). Process 400 also may include wirelessly receiving an HCI command at the device from the remote device (406) and processing the received HCI command at the device (408). Process 400 also may include wirelessly communicating an HCI event from the device to the remote device in response to processing the received HCI command (410).

In one exemplary implementation, the communication module 102 of FIGS. 1, 2 and 3 may establish a wireless connection with a remote device (402). For instance, the communication module 102 may establish a wireless connection with the remote device 124 of FIGS. 1, 2, and 3. Establishing the wireless connection with the remote device (402) may include establishing a Bluetooth wireless connection with the remote device. For example, the communication module 102 may establish a Bluetooth wireless connection with the remote device 124.

The remote mode module 104 of FIGS. 1, 2, and 3 may receive an enabling command at the device 180 of FIGS. 1, 2, and 3 (404). The received enabling command may place the device 180 in an HCI remote control mode that enables the remote device 124 to control the device 180 using one or more HCI commands. Receiving the enabling command at the device 180 (404) may include receiving the enabling command at the device 180 from a host device (e.g., host device 330 of FIG. 3) using a wired connection.

The remote mode module 104 may wirelessly receive an HCI command from the remote device 124 (406) and the remote mode module 104 may process the received HCI command at the device 180 (408). In one exemplary implementation, the device 180 may include an FM transceiver, such as, transceiver 216 of FIG. 2. In this manner, wirelessly receiving the HCI command from the remote device 124 (406) may include wirelessly receiving an HCI command that includes a command to control the FM transceiver (e.g., transceiver 216). Processing the received HCI command (408) may include the remote mode module 104 and/or the transceiver 216 processing the command to control the FM transceiver.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A device, comprising:
   a communication module that is arranged and configured to establish a Bluetooth wireless connection with a remote device; and
   a remote mode module that is arranged and configured to:
   receive and process an enabling command, wherein the enabling command is a specific instruction that is recognized and processed to enable a host controller interface (HCI) remote control mode on the device, wherein the HCI remote control mode enables the device to process and execute HCI commands at the device such that the remote device controls the device using one or more HCI commands over the Bluetooth wireless connection;
   receive an asynchronous connection-oriented logical (ACL) transport that includes an ACL header and an ACL payload over the Bluetooth wireless connection, wherein the ACL payload contains the one or more HCI commands; and
   process the one or more HCI commands contained in the ACL payload.

2. The device of claim 1 wherein the remote mode module is arranged and configured to receive the enabling command from a host device using a wired connection.

3. The device of claim 1 wherein the remote mode module is further arranged and configured to:
   wirelessly receive an HCI command in the ACL payload that includes a command to control an aspect of the device; and
   process the command to control the aspect of the device.

4. The device of claim 3 wherein the remote mode module is further configured to communicate an HCI event in the ACL payload to the remote device in response to processing the received HCI command.

5. The device of claim 1 further comprising a frequency modulation (FM) transceiver and wherein the remote mode module is further configured to:
   receive an HCI command in the ACL payload that includes a command to control an aspect of the FM transceiver; and
   process the command to control the aspect of the FM transceiver.

6. The device of claim 5 wherein the remote mode module is further configured to communicate an HCI event in the ACL payload to the remote device in response to processing the received HCI command.

7. The device of claim 1 wherein the remote mode module is further arranged and configured to:
   wirelessly receive an HCI command in the ACL payload that includes a Bluetooth command to execute a Bluetooth function on the device; and
   process the command to execute the Bluetooth function on the device.

8. An integrated circuit, comprising:
   a communication module that is arranged and configured to establish a Bluetooth wireless connection with a remote device; and
   a remote mode module that is arranged and configured to:
   receive and process an enabling command, wherein the enabling command is a specific instruction that is recognized and processed to enable a host controller interface (HCI) remote control mode on the integrated circuit, wherein the HCI remote control mode enables the integrated circuit to process and execute HCI commands at the integrated circuit such that the remote device controls the integrated circuit using one or more HCI commands over the Bluetooth wireless connection;
   receive an asynchronous connection-oriented logical (ACL) transport that includes an ACL header and an ACL payload over the Bluetooth wireless connection, wherein the ACL payload contains the one or more HCI commands; and
   process the one or more HCI commands contained in the ACL payload.

9. The integrated circuit of claim 8 wherein the remote mode module is arranged and configured to receive the enabling command from a host device using a wired connection.

10. The integrated circuit of claim 8 wherein the remote mode module is further arranged and configured to:
receive an HCI command in the ACL payload that includes a command to control an aspect of the integrated circuit; and
process the command to control the aspect of the integrated circuit.

11. The integrated circuit of claim 10 wherein the remote mode module is further configured to communicate an HCI event in the ACL payload to the remote device in response to processing the received HCI command.

12. The integrated circuit of claim 8 further comprising a frequency modulation (FM) transceiver and wherein the remote mode module is further configured to:
receive an HCI command in the ACL payload that includes a command to control an aspect of the FM transceiver; and
process the command to control the aspect of the FM transceiver.

13. The integrated circuit of claim 12 wherein the remote mode module is further configured to communicate an HCI event in the ACL payload to the remote device in response to processing the received HCI command.

14. A method for wirelessly controlling a device using a remote device, the method comprising:
establishing a Bluetooth wireless connection with a remote device;
receiving an enabling command at a device, wherein the enabling command is a specific instruction that is recognized and processed to enable a host controller interface (HCI) remote control mode on the device that enables the device to process and execute HCI commands at the device such that the remote device controls the device using one or more HCI commands;
wirelessly receiving an asynchronous connection-oriented logical (ACL) transport that includes an ACL header and an ACL payload over the Bluetooth wireless connection an HCI command at the device from the remote device wherein the ACL payload contains the HCI command; and
processing the received HCI command at the device.

15. The method as in claim 14 wherein receiving the enabling command at the device includes receiving the enabling command at the device from a host device using a wired connection.

16. The method as in claim 14 wherein:
the device includes a frequency modulation (FM) transceiver;
wirelessly receiving the ACL transport at the device from the remote device includes wirelessly receiving the ACL transport that includes an ACL payload containing an HCI command that includes a command to control the FM transceiver; and
processing the received HCI command includes processing the command to control the FM transceiver.

17. The method as in claim 14 further comprising wirelessly communicating an HCI event in the ACL payload from the device to the remote device in response to processing the received HCI command.

* * * * *